US011177935B2

(12) United States Patent
Musuvathi et al.

(10) Patent No.: US 11,177,935 B2
(45) Date of Patent: Nov. 16, 2021

(54) HOMOMORPHIC EVALUATION OF TENSOR PROGRAMS

(71) Applicant: MICROSOFT TECHNOLOGY LICENSING, LLC, Redmond, WA (US)

(72) Inventors: Madanlal S. Musuvathi, Redmond, WA (US); Kim Laine, Seattle, WA (US); Kristin E. Lauter, Redmond, WA (US); Hao Chen, Seattle, WA (US); Olli Ilari Saarikivi, Bellevue, WA (US); Saeed Maleki, Seattle, WA (US); Roshan Dathathri, Austin, TX (US); Todd D. Mytkowicz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 372 days.

(21) Appl. No.: 16/177,181

(22) Filed: Oct. 31, 2018

(65) Prior Publication Data
US 2020/0076570 A1    Mar. 5, 2020

Related U.S. Application Data

(60) Provisional application No. 62/726,001, filed on Aug. 31, 2018.

(51) Int. Cl.
*H04L 9/00* (2006.01)
*G06F 21/60* (2013.01)
(Continued)

(52) U.S. Cl.
CPC ............ *H04L 9/008* (2013.01); *G06F 21/602* (2013.01); *G06F 21/72* (2013.01); *H04L 43/04* (2013.01)

(58) Field of Classification Search
CPC ....... G06F 21/602; G06F 21/72; H04L 43/04; H04L 9/008
(Continued)

(56) References Cited

U.S. PATENT DOCUMENTS 7,386,839 B1 * 6/2008 Golender .............. G06F 11/366
717/131
10,396,976 B2 * 8/2019 Kahrobaei .............. H04L 9/008
(Continued)

OTHER PUBLICATIONS

Leveled Fully Homomorphic Signatures from Standard Lattices Sergey Gorbunov, Vinod Vaikuntanathan, Daniel Wichs STOC '15: Proceedings of the forty-seventh annual ACM symposium on Theory of Computing . Jun. 2015, pp. 469-477 (Year: 2015).*
(Continued)

*Primary Examiner* — Samson B Lemma
*Assistant Examiner* — Mohammad S Shams
(74) *Attorney, Agent, or Firm* — Shook, Hardy & Bacon L.L.P.

(57) ABSTRACT

Embodiments of the present invention provide systems, methods, and computer storage media directed to optimizing the generation, evaluation, and selection of tensor circuit specifications for a tensor circuit to perform homomorphic encryption operations on encrypted data. A computing device having an improved compiler and runtime configuration can obtain a tensor circuit and associated schema. The computing device can map the obtained tensor circuit to an equivalent tensor circuit, adapted to perform fully homomorphic encryption (FHE) operations, and instantiated based on the obtained associated scheme. The computing device can then monitor a flow of data through the equivalent FHE-adapted tensor circuit utilizing various tensor circuit specifications determined therefor. A cost of each tensor circuit specification can be determined by the computing device based on the monitored flow of data, so as to
(Continued)

identify an optimal set of optimal tensor circuit specifications that can be employed by the obtained tensor circuit, to efficiently perform homomorphic encryption operations on encrypted data.

19 Claims, 6 Drawing Sheets

(51) Int. Cl.
  *H04L 12/26* (2006.01)
  *G06F 21/72* (2013.01)
(58) Field of Classification Search
  USPC .......................................................... 380/28
  See application file for complete search history.

(56) References Cited

U.S. PATENT DOCUMENTS

| | | | |
|---|---|---|---|
| 10,594,472 B2* | 3/2020 | Ding | H04L 9/14 |
| 2014/0177828 A1* | 6/2014 | Loftus | H04L 9/0852 380/44 |
| 2014/0222994 A1* | 8/2014 | Castro | H04L 63/12 709/224 |
| 2014/0372769 A1* | 12/2014 | Kerschbaum | H04L 9/008 713/189 |
| 2015/0381348 A1* | 12/2015 | Takenaka | H04L 9/008 380/30 |
| 2016/0019457 A1* | 1/2016 | van der Made | G06N 3/04 706/25 |
| 2016/0191233 A1* | 6/2016 | Loftus | G06F 21/602 713/189 |
| 2017/0147835 A1* | 5/2017 | Bacon | G06F 21/602 |
| 2018/0212750 A1* | 7/2018 | Hoffstein | G06F 17/16 |
| 2018/0359078 A1* | 12/2018 | Jain | G06N 20/00 |
| 2018/0359084 A1* | 12/2018 | Jain | G06F 7/483 |
| 2019/0182216 A1* | 6/2019 | Gulak | G16H 10/60 |

OTHER PUBLICATIONS

Quantum homomorphic encryption for polynomial-sized circuits Yfke Dulek, Christian Schaffner, Florian Speelman University of Amsterdam, CWI, Amsterdam, QuSoft. pp 1-44 (Year: 2016).*
Foundations of Garbled circuit Mihir Bellare, Viet Tung Hoang, Philip Rogaway CCS '12: Proceedings of the 2012 ACM conference on Computer and communications security . Oct. 2012, pp. 784-796 (Year: 2012).*
Beaudry, et al., "The Complexity of Tensor Circuit Evaluation", In Computational Complexity, vol. 16, Issue 1, May 1, 2007, 52 Pages.
Chen, et al., "A fully homomorphic encryption scheme with better key size", In Journal of China Communications, China Institute of Communications, vol. 11, Issue 9, Sep. 1, 2014, 16 Pages.
Cheon, et al., "Homomorphic Encryption for Approximate Matrix Arithmetic", Retrieved From: https://pdfs.semanticscholar.org/1d19/038790db4a606b237ee3d39538f79fe8113a.pdf, Jun. 5, 2018, 19 Pages.
"International Search Report and Written opinion Issued in PCT Application No. PCT/US2019/039970", dated Aug. 27, 2019, 15 Pages.
"Intel Software Guard Extensions (Intel SGX)", Retrieved From: https://software.intel.com/sites/default/files/332680-002.pdf, Jun. 2015, 238 Pages.
"The CIFAR-10 Dataset", Retrieved From: https://web.archive.org/web/20191230071942/https://www.cs.toronto.edu/~kriz/cifar.html, Dec. 30, 2019, 4 Pages.
Acar, et al., "A Survey on Homomorphic Encryption Schemes: Theory and Implementation", In repository of arxiv; arXiv: 1704.03578, Oct. 6, 2017, 35 Pages.
Bajard, et al., "A Full RNS Variant of FV Like Somewhat Homomorphic Encryption Schemes", In Proceedings of International Conference on Selected Areas in Cryptography, Oct. 20, 2017, 29 Pages.

Benhamouda, et al., "Optimization of Bootstrapping in Circuits.", In Proceedings of Twenty-Eighth Annual ACM-SIAM Symposium on Discrete Algorithms, Jan. 16, 2017, pp. 2423-2433.
Bourse, et al., "Fast Homomorphic Evaluation of Deep Discretized Neural Networks", Retrieved From: https://eprint.iacr.org/2017/1114.pdf, Aug. 19, 2018, 30 Pages.
Brakerski, et al., "(Leveled) Fully Homomorphic Encryption Without Bootstrapping", In Proceedings of ACM Transactions on Computation Theory, vol. 6, No. 3, Jul. 2014, 36 Pages.
Carpov, et al., "A Multi-Start Heuristic for Multiplicative Depth Minimization of Boolean Circuits", In International Workshop on Combinatorial Algorithms, Jul. 17, 2017, 13 Pages.
Carpov, et al., "Armadillo: A Compilation Chain for Privacy Preserving Applications", Retrieved From: https://eprint.iacr.org/eprint-bin/versions.pl?entry=2014/988, Dec. 18, 2014, 15 Pages.
Chabanne, et al., "Privacy-Preserving Classification on Deep Neural Network", In Proceedings of IACR Cryptology ePrint Archive, Jan. 13, 2017, 18 Pages.
Chen, Hao, "Optimizing Relinearization in Circuits for Homomorphic Encryption", In repository of arxiv; arXiv:1711.06319, Oct. 25, 2017, 10 Pages.
Cheon, et al., "Bootstrapping for Approximate Homomorphic Encryption", In Annual International Conference on the Theory and Applications of Cryptographic Techniques, Apr. 29, 2018, pp. 360-384.
Cheon, et al., "Homomorphic Encryption for Arithmetic of Approximate Numbers", In International Conference on the Theory and Application of Cryptology and Information Security, Dec. 3, 2017, 23 Pages.
Chillotti, et al., "THFE: Fast Fully Homomorphic Encryption Over the Torus", In Journal of Cryptology, May 10, 2018, 59 Pages.
Dong, et al., "JCrypt: Towards Computation Over Encrypted Data", In Proceedings of 13th International Conference on Principles and Practices of Programming on the Java Platform: Virtual Machines, Languages, and Tools, Aug. 29, 2016, 12 Pages.
Dowlin, et al., "Cryptonets: Applying Neural Networks to Encrypted Data with High Throughput and Accuracy", In Proceedings of the 33rd International Conference on Machine Learning, Jun. 19, 2016, 10 Pages.
Fan, et al., "Somewhat Practical Fully Homomorphic Encryption", Retrieved From: https://eprint.iacr.org/2012/144.pdf, Mar. 17, 2012, 19 Pages.
Flynn, Michael J., "Some Computer Organizations and Their Effectiveness", In Journal of IEEE Transactions on Computers, vol. 21, Issue 9, Sep. 1972, pp. 948-960.
Gentry, Craig, "A Fully Homomorphic Encryption Scheme", In Dissertation for Department of Computer Science of Stanford University, vol. 20, No. 9, Sep. 2009, 209 Pages.
"Experiment with SqueezeNets", Retrieved From: https://github.com/kaizouman/tensorsandbox/tree/master/cifar10/models/squeeze, Jun. 26, 2017, 2 Pages.
Hoekstra, et al., "Using Innovative Instructions to Create Trustworthy Software Solutions", In Proceedings of 2nd International Workshop on Hardware and Architectural Support for Security and Privacy, Jun. 2013, 8 Pages.
Iandola, et al., "Squeezenet: Alexnet-Level Accuracy with 50x Fewer Parameters and <1MB Model Size", In repository of arxiv; arXiv:1602.07360, Feb. 24, 2016, 5 Pages.
Ioffe, et al., "Batch Normalization: Accelerating Deep Network Training by Reducing Internal Covariate Shift", In Proceedings of 32nd International Conference on Machine Learning, Jul. 6, 2015, 9 Pages.
Laine, Kim, "Simple Encrypted Arithmetic Library 2.3.1", Retrieved From: https://www.microsoft.com/en-us/research/uploads/prod/2017/11/sealmanual-2-3-1.pdf, 2017, 34 Pages.
Lecun, Yann, "The MNIST Database of Handwritten Digits", Retrieved From: https://web.archive.org/web/20020622183530/http://yann.lecun.com/exdb/mnist/, Jun. 22, 2002, 5 Pages.
Lyubashevsky, et al., "On Ideal Lattices and Learning with Errors Over Rings", In Proceedings of Annual International Conference on the Theory and Applications of Cryptographic Techniques, May 30, 2010, 23 Pages.

(56) References Cited

OTHER PUBLICATIONS

Mohassel, et al., "SecureML: A System for Scalable Privacy-Preserving Machine Learning", In Proceedings of IEEE Symposium on Security and Privacy, May 22, 2017, pp. 19-38.
Rouhani, et al., "DeepSecure: Scalable Provably-Secure Deep Learning", Retrieved From: https://arxiv.org/ftp/arxiv/papers/1705/1705.08963 pdf, May 2017, 13 Pages.
Tetali, et al., "MrCrypt: Static Analysis for Secure Cloud Computations", In Proceedings of ACM SIGPLAN International Conference on Object Oriented Programming Systems Languages & Applications, Oct. 29, 2013, 16 Pages.
Carpov, et al. "Cingulata", Retrieved From: https://github.com/CEA-LIST/Cingulata/, Nov. 12, 2017, 2 Pages.
Wu, et al., "tensorflow/models/convolutional.py", Retrieved From: https://github.com/tensorflow/models/blob/v1.9.0/tutorials/image/mnist/convolutional.py, Mar. 2, 2018, 8 Pages.

* cited by examiner

HOMOMORPHIC EVALUATION OF TENSOR PROGRAMS

CROSS-REFERENCE TO RELATED APPLICATIONS

This application is related by subject matter and claims priority to U.S. Provisional Patent Application No. 62/726,001, filed Aug. 31, 2018, and entitled HOMOMORPHIC EVALUATION OF TENSOR PROGRAMS, which is assigned or under obligation of assignment to the same entity as this application, the entire contents of which are incorporated herein by reference.

BACKGROUND

With the advent and wide-scale adoption of cloud storage and computing, data security and privacy are becoming increasingly important to cloud service providers and consumers alike. Various consumer groups, particularly those under strict secrecy and privacy standards, can be deterred from utilizing cloud services due to concerns of data breaches on sensitive data. Cloud service providers must develop functional solutions that give their consumers confidence that their data is secure, without compromising inefficiencies in the development process. Fully homomorphic encryption (FHE) is a technology that enables computations to be performed directly on encrypted data, which is an appealing solution to cloud service providers. The process for developing fully homomorphic encryption applications, however, can be inefficient due to high costs generally associated with operational noise introduced when utilizing conventional fully homomorphic encryption schemes. The process for singling out optimal fully homomorphic encryption schemes for various operations can be extremely costly on both computing resources and the development process.

SUMMARY

Embodiments of the present invention relate to fully homomorphic encryption. More specifically, embodiments describe systems and techniques for optimizing the generation, evaluation, and selection of FHE-adapted tensor circuits and corresponding specifications (e.g., encryption parameters, data layouts) to perform homomorphic encryption operations on encrypted data.

In various embodiments, an input tensor circuit and an associated schema, such as inputs and weights to the circuit, is obtained by a computing device for evaluation. The obtained input tensor circuit is mapped to an equivalent tensor circuit, more specifically, one that is employable to perform fully homomorphic encryption (FHE) operations. The equivalent tensor circuit is generated for the obtained input tensor circuit based on the obtained schema associated with the obtained input tensor circuit. The computing device can also obtain an encrypted piece of data, along with unencrypted weights and public key(s) of private-public key pair(s), for evaluating the obtained input tensor circuit. The generated equivalent tensor circuit (hereinafter referred to as an "FHE-adapted tensor circuit"), having a particular specification (e.g., data layout, encryption parameters), can then symbolically executed to perform a plurality of homomorphic computations on the encrypted piece of data. During symbolic execution of the generated equivalent FHE-adapted tensor circuit, a flow of data (e.g., library calls) passing through the generated equivalent FHE-adapted tensor circuit can be monitored by the computing device, such that characteristics of the data flow (e.g., a count of library calls) can be tracked and/or stored for the generated equivalent FHE-adapted tensor circuit having the particular specification. A set of results can then be generated based on the symbolic execution of the generated equivalent FHE-adapted tensor circuit. The computing device can then generate another equivalent FHE-adapted tensor circuit having a different corresponding specification based on the generated set of results. The process of generating a variety of specifications for an equivalent FHE-adapted tensor circuit and tracking the flow of data there through can be repeated, enabling the computing device to determine a cost (e.g., efficiency, noise, asymptotic complexity) of each generated equivalent FHE-adapted tensor circuit having a corresponding specification. The determined costs can be employed to rank the various specifications and/or narrow the various specifications into a smaller subset of more or most efficient tensor circuit specifications. In this regard, the computing device can select the smaller subset of tensor circuit specifications based on their corresponding determined costs, reducing overhead costs (e.g., energy, computing resources, time) associated with conventional techniques for evaluating tensor programs on homomorphically encrypted data.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
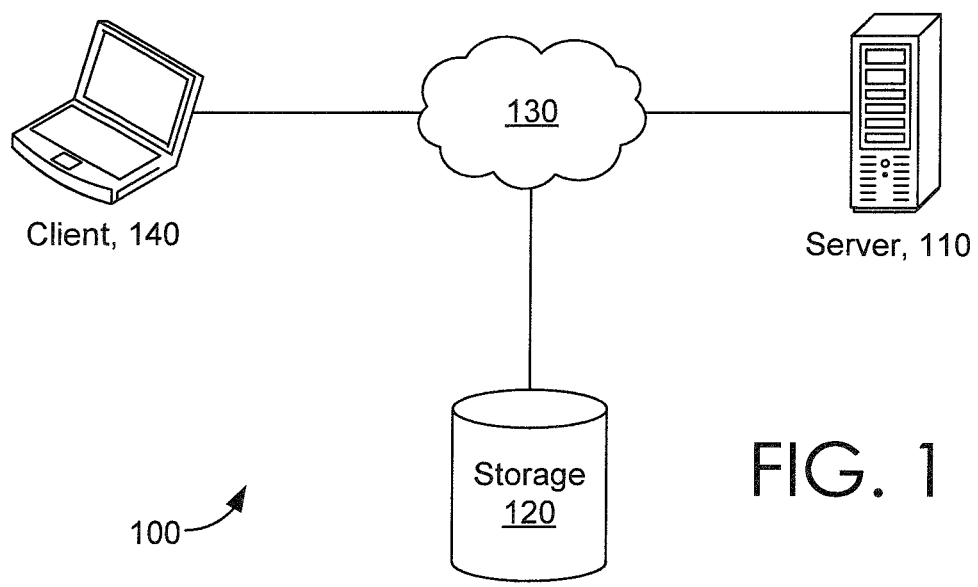
FIG. 1 is a schematic of an exemplary system depicted in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Many computing applications benefit from the ability to store and process data in the cloud (i.e., on a remote, network-accessible computing system). Cloud providers centralize and manage computing and storage resources, which lets developers focus on the logic of their application, providing a means for the developers to work free from the concerns of deployment and management of the infrastructure that surrounds the application. A large class of applications, however, have strict data secrecy and privacy requirements. In such cases, data secrecy and privacy issues end up limiting otherwise convenient adoption of cloud-based solutions.

Fully Homomorphic Encryption (FHE) provides a simple trust model: the owner of the data does not need to trust the cloud software provider or the hardware vendor. FHE allows computations to be applied directly on encrypted data and thus can enable a wider variety of cloud applications to be made available. A cloud based FHE application can encrypt its plaintext input "a" and store it in encrypted form (e.g., in cloud storage) as "$\alpha$." At a later time, the application can request the cloud to perform an FHE operation "f" on the encrypted data "a" and to store the still encrypted result "$\beta=f(\alpha)$." The application can then download "$\beta$" from cloud storage at any point and decrypt the result to obtain a plaintext (i.e., decrypted) result "b=f($\alpha$)."

While aspects of FHE can provide a breakthrough in cloud computing technologies, there are many costs associated with the integration of FHE in cloud computing. For instance, FHE operations on encrypted data can be significantly slower when compared to operations performed on their plaintext counterparts. Despite these setbacks, some entities are willing to settle for these inefficiencies in exchange for a more secure cloud-based solution. In order to build an efficient FHE application, conventional techniques require that FHE encryption schemes be manually determined, which introduces a significant factor of human error. The process for identifying optimal encryption schemes can be extremely time consuming, and the adoption of a particular encryption scheme can introduce undesirable noise that effectively renders the FHE application useless or extremely inefficient. Naturally, the development of FHE applications can waste time, energy, and computing resources on a large scale because conventional techniques do not provide a means for evaluating FHE encryption schemes in an efficient manner, and with a high level of precision. Also to note, some FHE schemes support vectorized operations, otherwise known as "batching," with very large vector sizes. In this regard, application efficiency crucially relies on maximizing the parallelism available in the application to utilize the vector capabilities, and the ability to maximize the availability of parallelism can be a daunting task. Lastly, FHE schemes can limit the operations allowed in an application (i.e., no branches or control flow) and thus requires a developer to creatively structure their program to work around these limitations. Provided the foregoing, there is a clear need to provide efficient techniques to ensure optimal performance, security, and management of noise when performing operations on encrypted data.

Embodiments described herein are generally directed to the application of employing deep-neural network inference computations to the FHE space. There are multiple benefits to employing deep-neural network inference computations to the FHE space. For instance, deep-neural network inference computations do not involve a discrete control flow, which is ideal for use in FHE applications. Further, deep-neural network inference involves non-polynomial activation functions, which can be effectively replaced with polynomial approximations. The fact that deep-neural networks can tolerate errors provides a level of flexibility to quantize and reduce the precision of the computation for performance evaluation, tuning, and optimization, among other things. As such, embodiments described herein are more particularly directed to optimizing the generation, evaluation, and selection of FHE-adapted tensor circuits and corresponding tensor circuit specifications (e.g., parameters, data layouts) for performing homomorphic encryption operations on encrypted data. More particularly, embodiments described herein can automate the generation and selection of optimal (i.e., cost efficient) encryption parameters and data layouts, among other things, for configuring a tensor circuit (hereinafter referenced as a "FHE-adapted" tensor circuit) having maximized performance, precision, and improved security when utilized to perform deep-neural network inference computations.

Turning now to FIG. 1, a schematic depiction is provided illustrating an exemplary homomorphic evaluation system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The homomorphic evaluation system 100 depicted in FIG. 1 includes a computing device, such as homomorphic evaluation server 110, having one or more processors and a memory. In various embodiments, the homomorphic evaluation server 110 can obtain an input tensor circuit and an associated schema for evaluation, among other things. The homomorphic evaluation server 110 can obtain the input tensor circuit and associated schema either by retrieving them from a coupled storage device, such as storage device 120, or by receiving them from a client device, such as client device 140 via a network, such as network 130. The storage device 120 can include a database or any other storage medium or another computing device associated with the storage medium for storing data that is generated or retrievable by the homomorphic evaluation server 110. The network 130 can include any type of networking medium, such as the Internet, a LAN, WAN, telecommunications network, peer-to-peer network, near-field technologies, RF, and the like. Moreover, communications transmitted through the network 130 can be wired or wireless, or any combination thereof. In various embodiments, any combination or format of results generated by homomorphic evaluation server 110 based on an evaluation of various specifications for the input tensor circuit can be stored in storage device 120, provided for display by homomorphic evaluation server 110, or communicated from the homomorphic evaluation server 110 to client device 140 for display thereby.

In some embodiments, an input tensor circuit and an associated schema, such as inputs and weights to the input tensor circuit, is received by the homomorphic evaluation server 110 from client device 140 or obtained from a storage device 120 for evaluation. The obtained input tensor circuit can be mapped to an equivalent FHE-adapted tensor circuit that is generated for the input tensor circuit based on the schema associated with the obtained input tensor circuit. The homomorphic evaluation server 110 can also receive from the client device 140, or obtain from the storage device 120, an encrypted piece of data (e.g., an encrypted image, file, or other digital asset), along with unencrypted weights and public key(s) of private-public key pair(s) for evaluating the input tensor circuit. The homomorphic evaluation server 110 can then symbolically execute the generated equivalent FHE-adapted tensor circuit to perform a plurality of homomorphic computations on the encrypted piece of data. During symbolic execution of the generated equivalent FHE-adapted tensor circuit, the homomorphic evaluation server 110 can monitor a flow of data (e.g., operations, calls to a library) being generated or processed by the generated equivalent FHE-adapted tensor circuit. The monitored flow of data can be employed by homomorphic evaluation server 110 to determine an efficiency cost associated with a current specification (e.g., encryption parameters, data layout) of the generated equivalent FHE-adapted tensor circuit, among other things. The homomorphic evaluation server 110 can generate a set of results based on the symbolic execution of the generated equivalent FHE-adapted tensor circuit under the current specification, whereby the generated set of results can be stored in storage device 120 or communicated to client device 140. The homomorphic evaluation server 110 can then specify new parameters to generate another equivalent FHE-adapted tensor circuit having a different corresponding specification based on the generated set of results. This process can be referred to herein as "transforming" the equivalent FHE-adapted tensor circuit, which includes determining a set of parameters to utilize for the input tensor circuit and directly mapping the input tensor circuit to an equivalent FHE-adapted tensor circuit having parameters left unspecified. The process of generating (i.e., transforming) equivalent FHE-adapted tensor circuits and tracking the flow of data there through can be repeated, enabling the homomorphic evaluation server 110 to determine a cost (e.g., efficiency, noise, asymptotic complexity) of each generated equivalent FHE-adapted tensor circuit having a corresponding specification. The determined costs can be employed to rank and/or narrow the various specifications into a smaller subset of more or most cost-efficient (e.g., fast, accurate, secure) tensor circuit specifications. In this regard, the homomorphic evaluation server 110 can select the smaller subset of tensor circuit specifications for an equivalent FHE-adapted tensor circuit based on their corresponding costs, reducing overhead costs (e.g., energy, computing resources, time) associated with conventional techniques for evaluating tensor programs on homomorphically encrypted data.

On a high level, the homomorphic evaluation server 110 can include compiler and runtime components (also referenced herein as "CHET") that are specifically adapted to perform homomorphic evaluation of tensor programs or "circuits". In various embodiments, the homomorphic evaluation server 110 can employ an encryption scheme that facilitates approximate arithmetic to emulate fixed-point arithmetic, which is generally required to perform deep neural network inference computations. More information regarding an exemplary encryption scheme (herein also referenced as a "CKKS" encryption scheme) employable by the homomorphic evaluation server 110 can be found in "*Homomorphic encryption for arithmetic of approximate numbers*," Jung Hee Cheon, Andrey Kim, Miran Kim, and Yongsoo Song, Advances in Cryptology—ASIACRYPT 2017, LNCS 10624, pages 409-437, also describing an accessible library of encryption schemes relating to homomorphic encryption for arithmetic of approximate numbers (referenced herein as "HEAAN" encryption schemes). By employing the compiler and runtime components, the homomorphic evaluation server 110 can, among other things, explore a variety of optimization choices, such as various ways to pack data into ciphertexts, and various ways to implement computational kernels for each layout of a given tensor circuit. The homomorphic evaluation server 110 runtime component can include, similar to linear algebra libraries typically utilized in unencrypted evaluation of neural networks, a set of layouts and unified metadata representations for the layouts. In this regard, each layout can be associated with a corresponding computational kernel that implements the common operations found in convolutional neural networks ("CNNs").

Figure 2:
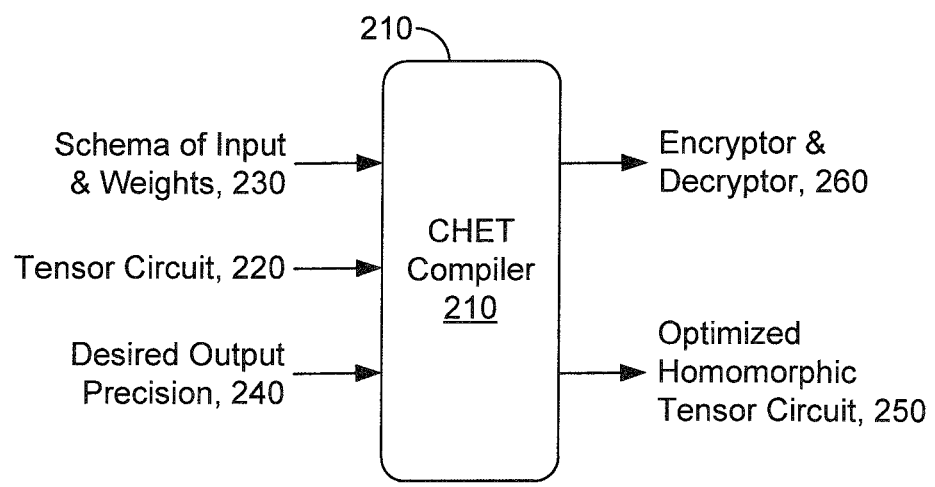
FIG. 2 is a data flow diagram depicting inputs and outputs of an exemplary compiler component in accordance with some embodiments of the present invention.

Looking now to FIG. 2, data flow diagram 200 is provided depicting inputs and outputs of an exemplary compiler component of a computing device such as homomorphic evaluation server 110 of FIG. 1. The data flow diagram 200 illustrates an exemplary compiler component 210 ("CHET compiler") that is employable to perform evaluations of tensor programs (i.e., circuits) on homomorphically encrypted data. On a high level, the compiler component 210 is responsible for generating an optimized FHE-adapted tensor circuit that not only produces accurate results, but also drastically improves security of the data being computed. As briefly described with regard to FIG. 1, the homomorphic evaluation server 110 can obtain a tensor circuit 220 and a schema 230 corresponding to the input and weights to the tensor circuit 220. The schema 230 specifies the dimensions of the tensors as well the floating-point precision required of the values in those tensors. The homomorphic evaluation server 110 can also obtain the desired floating-point precision 240 of the output of the circuit, which can be received from a client device, such as client device 140 of FIG. 1, or retrieved from a memory or a storage device 120. Utilizing the schema and desired floating-point precision, compiler component 210 can generate an equivalent, optimized FHE-adapted tensor circuit 250 as well as encryptor and decryptor 260 executables, which are employable by the server device 110 and/or client device 140 to generate private-public key pairs, encrypt pieces of data, and/or decrypt pieces of data, among other things. Both of these executables can be employed to encode the choices made by the compiler component 210 to make the homomorphic computation more secure and efficient.

Figure 3:
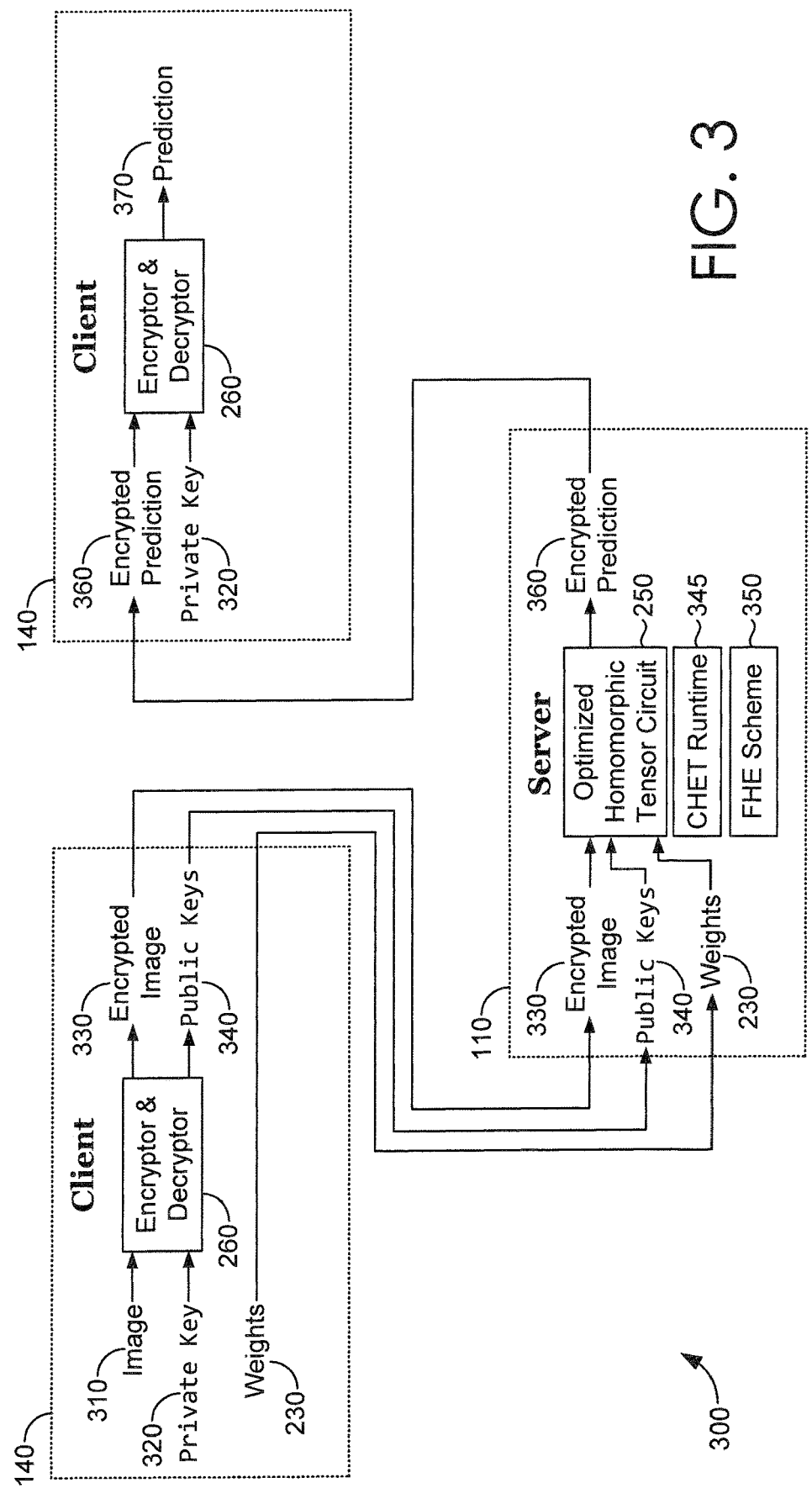
FIG. 3 is a data flow diagram depicting inputs and outputs of an exemplary runtime component in accordance with some embodiments of the present invention.

Looking now to FIG. 3 with cross-reference to FIG. 1, a data flow diagram 300 is provided depicting inputs and outputs of a homomorphic evaluation system, such as homomorphic evaluation system 100 of FIG. 1. In various embodiments, the homomorphic evaluation system 100 can be employed to evaluate an input tensor circuit on a piece of data (e.g., an image, a document, a digital asset). By way of example, and on a high level, client device 140 can employ a private key(s) 320 to encrypt a piece of data, such as image 310, by way of non-limiting example. The private key(s) 320 employed to encrypt the image 310 can be obtained from an encryptor, which can be generated and/or provided to the client by the homomorphic evaluation server 110. The encrypted image 330 can be communicated to the homomorphic evaluation server 110, along with unencrypted weights 230 and public keys 340 (i.e., public key(s) associated with the private key(s)) required to evaluate homomorphic operations on the encrypted piece of data. The homomorphic evaluation server 110 can receive the encrypted image 330, unencrypted weights 230, and public keys 340, which can be stored in a memory of homomorphic evaluation server 110 or a storage device 120 coupled to the homomorphic evaluation server 110. The homomorphic evaluation server 110 can employ a compiler component, such as compiler component 210 of FIG. 2, to generate an optimized FHE-adapted tensor circuit 250 based on the received encrypted image 330, unencrypted weights 230, and public keys 340. The homomorphic evaluation server 110 can also employ a runtime component 345 ("CHET runtime") to symbolically execute homomorphic tensor operations with the generated optimized FHE-adapted tensor circuit 240. In various embodiments, an underlying FHE scheme 350 can be employed to symbolically execute the homomorphic computations on the encrypted image 330 and to generate an encrypted prediction 360, which can then be communicated to the client device 140 via network 130. The client device 140 can receive the encrypted prediction 360 and employ its private key(s) 320 to decrypt the encrypted prediction 360 with a decryptor 260, which can be generated and/or provided to the client device 140 by the homomorphic evaluation server 110. In this way, the client device 140 can run tensor programs similar to neural networks on the homomorphic evaluation server 110 without the homomorphic evaluation server 110 being privy to the data (e.g., the unencrypted image 310), the output (i.e., the prediction 370), or any intermediate state.

Figure 4:
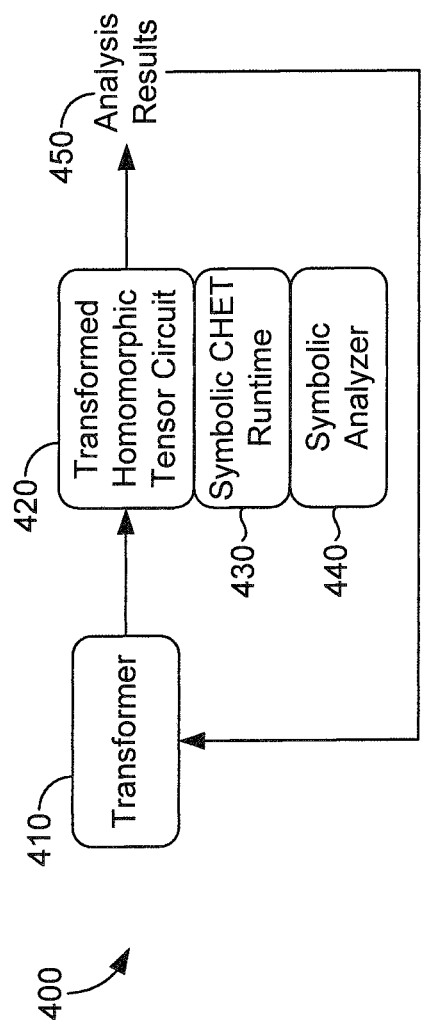
FIG. 4 is a process flow diagram depicting a process flow for transforming a tensor circuit employable to perform fully homomorphic encryption operations according to some embodiments of the present invention.

With reference now to FIG. 4, a process flow diagram 400 is provided depicting a process flow for transforming (e.g., via compiler component 210 of FIG. 2) a FHE-adapted tensor circuit. As briefly noted, the compiler component 210 of FIG. 2 can generate optimized FHE-adapted tensor circuits that both produces accurate results and drastically improves data security and computing performance, among other things. The compiler component 210 can effectively analyze and transform various FHE-adapted tensor circuit specifications to generate new optimized FHE-adapted tensor circuits. In contrast to most traditional optimizing compilers, the input tensor circuit has two key properties that the compiler component 210 can exploit: the data flow graph is a Directed Acyclic Graph (DAG) and the tensor dimensions are known at compile-time from the provided schema associated with the input tensor circuit. The compiler component 210 can also analyze multiple data flow graphs corresponding to different specifications exhaustively, one at a time, which is certainly feasible because of the limited design space.

In some embodiments, the compiler component 210 only needs to determine a policy to execute homomorphic computation while a runtime component, such as runtime component 345 of FIG. 3, handles the mechanisms of efficient execution. In various embodiments, homomorphic evaluation server 110 can include a homomorphic instruction set architecture (also referenced herein as "HISA") that decouples compiler optimizations and runtimes for supporting FHE applications from advancements in the underlying FHE schemes. The compiler component 210 can generate high-level homomorphic tensor operations, but the executed low-level HISA instructions need to be analyzed. As such, the homomorphic evaluation server 110 can exploit the runtime component 345 to directly perform such an analysis.

The process flow diagram 400 of FIG. 4 depicts the process flow of a single analysis and transformation pass in the compiler component 210. The compiler component 210 can include a transformer component 410 that specifies the encryption parameters to utilize with an input tensor circuit. In various embodiments, the input tensor circuit can be directly mapped to an equivalent FHE-adapted tensor circuit with parameters left unspecified, thereby producing or generating a "transformed" FHE-adapted tensor circuit 420. This transformed FHE-adapted tensor circuit 420 can be symbolically executed via a runtime component 430 ("symbolic CHT runtime"), such as runtime component 345 ("CHET runtime") of FIG. 3. The symbolic execution of the transformed FHE-adapted tensor circuit 420 includes an execution of the same instructions (e.g., HISA instructions) that would be executed at runtime because the tensor dimensions are known. Instead of executing these instructions using the FHE scheme, the instructions invoke a symbolic analyzer 440, which can monitor the data (e.g., library calls, operations) that flows through the transformed FHE-adapted tensor circuit 420. In some embodiments, the transformed FHE-adapted tensor circuit 420 is a directed acyclic graph ("DAG"), and as such, iteration to a fix-point is unnecessary. The directed acyclic graph can be unrolled on-the-fly to dynamically track the data flow through the transformed FHE-adapted tensor circuit 420, without having to construct an explicit directed acyclic graph. In various embodiments, the symbolic analyzer 440 can employ a plurality of analyzer operations to track different information flows through the transformed FHE-adapted tensor circuit 420. In some further embodiments, the symbolic analyzer 440 can return one or more results obtained from tracking the data flow as an output of the symbolic execution. The transformer component 410 can then utilize the result(s) to generate a new, transformed specification of the FHE-adapted tensor circuit.

Figure 5:
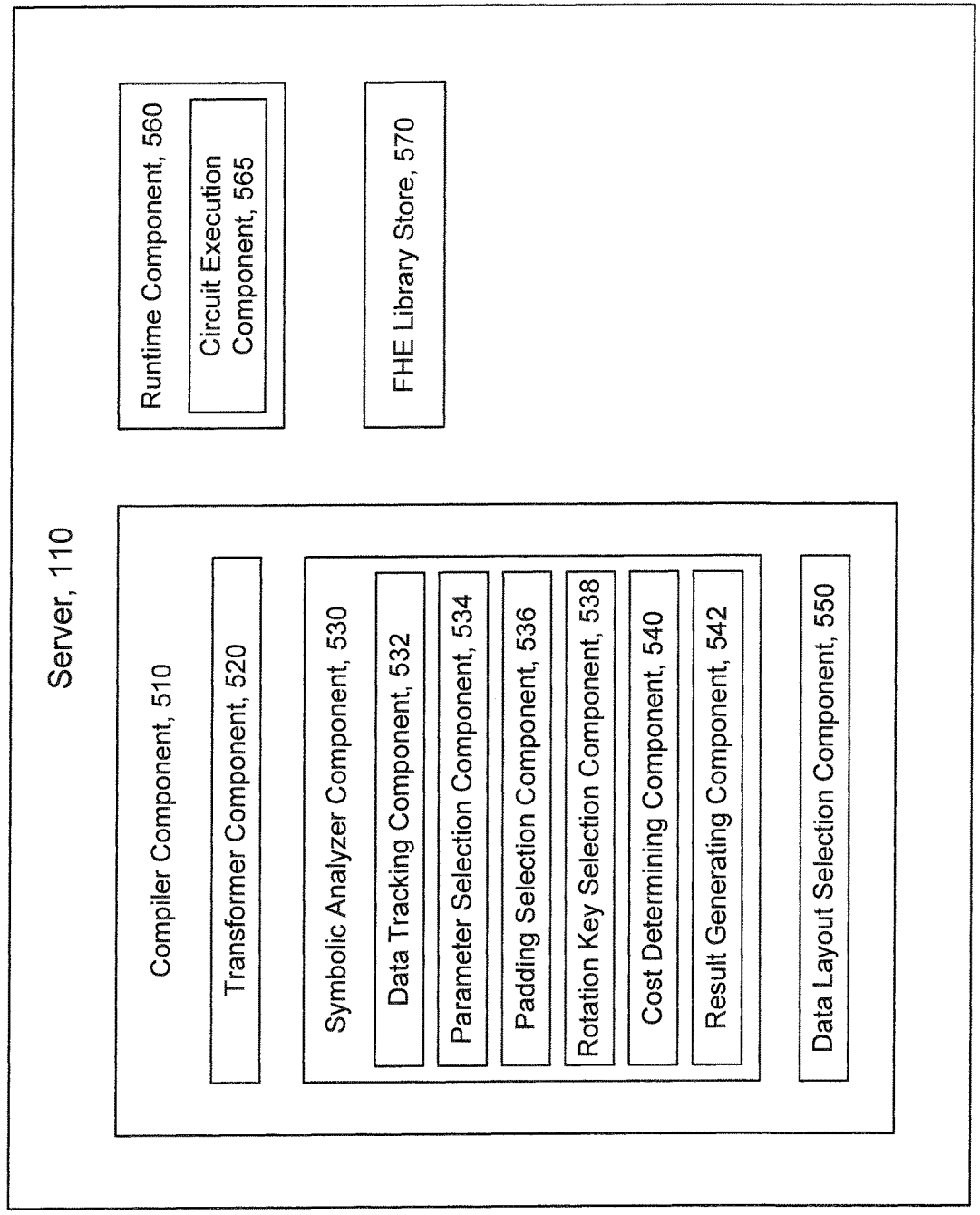
FIG. 5 is a block diagram depicting an exemplary computing device having exemplary compiler and runtime components in accordance with some embodiments of the present invention.

Turning now to FIG. 5, a block diagram 500 depicting an exemplary server 110, such as homomorphic evaluation server 110 of FIG. 1, having exemplary compiler 510 and runtime 560 components in accordance with some embodiments of the invention is provided. As described, the homomorphic evaluation server 110 can include a compiler component 510 (e.g., compiler component 210 ("CHET compiler") of FIG. 2) and a runtime component 560 (e.g., runtime component 345 ("CHET runtime") of FIG. 3) for performing homomorphic evaluations of tensor circuits on homomorphically encrypted data.

The homomorphic evaluation server 110 can also include a FHE library store 570, which can include a homomorphic instruction set architecture ("HISA") that cleanly abstracts and exposes various features of FHE libraries. In various embodiments, the HISA can be employed by the compiler component 510 to interact with an FHE scheme adopted by the homomorphic evaluation server 110 to facilitate various features described herein. More specifically, the HISA of the FHE library store 570 is designed to abstract details of homomorphic encryption schemes, such as use of evaluation keys and management of moduli, to provide a common interface to shared functionality in FHE libraries while exposing unique features, and not to include the complexities associated with plaintext evaluation but to instead be embedded into a host language.

The HISA can be split into multiple profiles, such that all libraries are expected to implement at least the encryption profile. For instance, each FHE implementing the HISA provides two types, "pt" for plaintexts and "ct" for ciphertexts, and additional ones depending on the various profiles implemented by the FHE library store 570. Among other things, the encryption profile can provide core functionality for encryption, decryption, and memory management. Usage of encryption and evaluation keys can be left as a responsibility of FHE libraries, such that they are not exposed in the HISA.

In various embodiments, the HISA can include an Integers profile that can provide operations for encoding and computing on integers. The Integers profile can cover both FHE schemes with batched encodings and ones without, by having a configurable number of slots "s," which can be provided as an additional parameter during initialization of the FHE library.

In various embodiments, the HISA can further include a Division profile that can expose extra functionality provided by a family of encryption schemes, such as the HEAAN family of encryption schemes, by way of non-limiting example. For libraries implementing a base CKKS encryption scheme, a function "maxScalarDiv(c,ub)" can return a largest power-of-two d such that d<ub and d<q, where q is a modulus of c. For a variation of CKKS based on residue number systems, "maxScalarDiv(c,ub)" can return a largest coprime modulus of c less than ub, or "1" if there is none. This way the Division profile can cleanly expose the division functionality of both variants of the CKKS encryption scheme.

The HISA can further include a Relin profile that can provide the capability to separate multiplication from re-linearization. While re-linearization is semantically a no-op, it can be useful to expose relinearize calls to the compiler component 510, as their proper placement is a highly non-trivial (e.g., NP-complete) problem.

The HISA can further include a Bootstrap profile that can expose bootstrapping in FHE libraries that support it. While bootstrapping is semantically a no-op, it should be exposed in the HISA because selection of encryption parameters depends on when bootstrapping is performed. Furthermore, the optimal placement of bootstrapping operations can depend on the tensor program ("circuit") being evaluated. For instance, "wide" programs with a lot of concurrent operations can bootstrap at lower depths more so than "narrow" programs that are mostly sequential.

In various embodiments, the HISA can be implemented either with precise or approximate semantics. With approximate semantics all operations that return a "pt" or "ct" can introduce an error term. It is expected that this error is from some random distribution that may be bounded given a confidence level. However, the HISA does not offer instructions for estimating the error, as these estimates can be required during selection of fixed point precisions and encryption parameters. Instead, in some embodiments, the approximate FHE libraries can provide implementations of the HISA with no actual encryption and either a way to query safe estimates of errors accumulated in each "pt" and "ct," or sampling of error from the same distribution as encrypted evaluation can produce. Both approaches can be employed by a compiler component 510 for selecting fixed point precisions. The sampling approach can be more flexible for applications where it is more difficult to quantify acceptable bounds for error, such as neural network classification, where only maintaining the order of results matters.

Initialization of FHE libraries is generally specific to the encryption and encoding scheme being utilized. Nonetheless, initialization can include at least generating or importing encryption and evaluation keys. FHE libraries implementing leveled encryption schemes can also require a selection of encryption parameters that are large enough to allow the computation to succeed. Such FHE libraries should provide analysis passes as additional implementations of the HISA to help with parameter selection, among other things.

By way of background, Intel's math kernel libraries (MKL) are generally known to provide efficient implementations of basic linear algebra subprogram (BLAS) operations. In a similar fashion, the runtime component 510 can be designed to provide efficient implementations for homomorphic tensor primitives. While the interface for BLAS and tensor operations are well-defined, the interface for a tensor operation on encrypted data is not necessarily apparent because the encrypted data can be an encryption of a vector, whereas the tensor operation is on higher-dimensional tensors. In this regard, types need to be reconciled to define a clean interface. For purposes of explanation, a 4-dimensional tensor (batch, channel, height, and width dimensions) is considered throughout various discussions to provide an exemplary implementation, but it is considered that concepts can be similarly applied to other higher-dimensional tensors and the inclusion of any sized sensor is within the purview of the present disclosure.

Moving on, in various embodiments, a cipher tensor datatype can be defined by the runtime component 510. Each tensor operation on unencrypted tensors can correspond to an equivalent homomorphic tensor operation on cipher tensor(s) and plain tensor(s), if any. In various embodiments, the cipher tensor datatype needs to allow padding or logical re-shaping without changing the elements of a tensor circuit. To satisfy these requirements, runtime component 510 can define a cipher tensor datatype, herein referenced as "CipherTensor," which includes a vector of ciphertexts (i.e., vectors) with associated metadata that captures the way to interpret the vector of ciphertexts as the corresponding unencrypted tensor. The metadata can include physical dimensions of the (outer) vector and those of the (inner) ciphertext, logical dimensions of the equivalent unencrypted tensor, and physical strides for each dimension of the (inner) ciphertext.

The runtime component 510 can store, in a memory or storage device, the metadata as plain integers so that they can be modified easily. Nevertheless, the metadata does not leak any information about the data because it is agnostic to the values of the tensor and is solely reliant on the schema or dimensions of the tensor. The metadata can be utilized by runtime component 510 to satisfy all the required constraints of the datatype. The metadata can include parameters that the compiler component 510 can choose to instantiate and employ a specific data layout. For example, a process referenced herein as "HW-tiling" can include blocking or tiling the inner dimension (e.g., height and width) of a 4-d tensor that can correspond to choosing two dimensions for an (outer) vector and two dimensions for an (inner) ciphertext, where the logical dimensions match the physical dimensions. Another option, referenced herein as "CHW-tiling," is to block the channel dimension as well, such that multiple, but not all, channels can be in a cipher. This can correspond to choosing two dimensions for the (outer) vector and three dimensions for the (inner) ciphertext with only four logical dimensions.

In various embodiments physical strides of each dimension can be specified to include sufficient padding in between elements of the dimension. For example, for an image of height (row) and width (column) of twenty-eight, a stride of "one" for the width dimension and a stride of "thirty" for the height dimension allows a padding of two (e.g., zero or invalid) elements between the rows. Reshaping the cipher tensor can thus only include updating the metadata to change the logical dimensions and does not perform any homomorphic operations.

The interface for a homomorphic tensor operation is mostly similar to that of its unencrypted tensor operation counterpart, except that the types are replaced with cipher tensors or plain tensors, which are referenced herein as "CipherTensor" and "PlainTensor," respectively. The homomorphic tensor operation can also expose the output CipherTensor in the interface as a pass-by-reference parameter to enable the compiler component 510 to specify the data layout of both the input and output CipherTensors. In addition, the interface can expose parameters to specify the scaling factors to use for the input CipherTensor(s) and PlainTensor(s), if any. When the compiler component 510 specifies all these parameters, it can choose an implementation specialized for this specification. There might be multiple implementations for the same specification that are tuned for specific FHE libraries (e.g., for those that have divScalar and for those that do not). In such cases, the compiler component 510 can also choose the implementation to use. Nevertheless, there can be several algorithm choices provided for a given specification that have significant impact on the performance of the operation.

In various embodiments, the compiler component 510 can generally be responsible for generating an optimized FHE-adapted tensor circuit that not only produces accurate results but also drastically improves security of the data being computed. An analysis and transformation framework used by the compiler component 510 can be provided to perform transformations of the tensor circuit that are required for accuracy and security, and to also perform optimizations that significantly improve performance of the tensor circuit.

As noted, in contrast to most traditional optimizing compilers, the input tensor circuit includes two key properties that the compiler component 510 can exploit: the data flow graph is a Directed Acyclic Graph ("DAG") and the tensor dimensions are known at compile-time from the schema provided by the user. The compiler component 510 can analyze multiple data flow graphs corresponding to different implementations. As the design space is not that large the compiler component 510 can explore the design space exhaustively, one at a time. In some embodiments, the compiler component 510 can determine a policy to execute homomorphic computations while the runtime component 560 can handle the mechanisms of efficient execution. This separation of concerns can simplify the code generation tasks of the compiler component 510 but could, in some instances, complicate the analysis required. Thus, the compiler component 510 can generate high-level homomorphic tensor operations, but will require an analysis of low-level HISA instructions being executed. To resolve this, runtime component 560 can be directly employed to perform the analysis.

In various embodiments, the compiler component 510 can include a transformer component 520 that can define parameters to utilize in the FHE-adapted tensor circuit (e.g., the input tensor circuit that is directly mapped to an equivalent FHE-adapted tensor circuit with parameters left unspecified). This transformed FHE-adapted tensor circuit can be symbolically executed using the runtime component 560. This would execute the same HISA instructions that would be executed at runtime because the tensor dimensions are known. Instead of executing these HISA instructions utilizing the FHE scheme, the HISA instructions can invoke a symbolic analyzer 530.

The symbolic analyzer 530 can include, among other things, a data tracking component 532, a parameter selection component 534, a padding selection component 536, a rotation key selection component 538, a cost determining component 540, and a result generating component 542. The data tracking component 532 can monitor data that flows through a given tensor circuit and log a variety of characteristics of the tensor circuit, such as a number of library calls, a number of operations being performed, and the like. In various embodiments, a repeated iteration to a fix-point is not necessary, as the tensor circuit is a directed acyclic graph. The directed acyclic graph is unrolled on-the-fly by symbolic analyzer 530 to dynamically track the data flow via data tracking component 532, without having to construct an explicit directed acyclic graph. In various embodiments, data tracking component 532 can include one or more subcomponents or analyzers that can track different information flows. The symbolic analyzer 530 can return results generated based on the symbolic execution of the tensor circuit as an output of the symbolic execution. The transformer component 520 can then utilize the results generated by symbolic analyzer 530 to instantiate a new, transformed specification of the FHE-adapted tensor circuit.

The parameter selection component 534 can be employed by compiler component 510 to select encryption parameters that provide accurate output data when a tensor circuit is executed. To do so, the parameter selection component 534 can analyze a depth of the tensor circuit. By way of example only, in the HEAAN family of encryption schemes, divScalar consumes modulus Q from the ciphertext it is called on. The output should have sufficient modulus Q left to capture accurate results. The symbolic analyzer 530 can thus be designed with a dummy ciphertext datatype that increments the modulus Q of the input ciphertext and copies into the output ciphertext whenever divScalar is called. This can be distinguished with other HISA instructions, which only copy the modulus from input to output. Here, the modulus Q in the dummy output ciphertext corresponds to the depth of the circuit. The input ciphertext can then be encrypted with modulus Q that is at least the sum of the depth of the circuit and the desired output precision to ensure accurate results. For the input modulus Q, a large enough N can be chosen to improve, or in some instances guarantee, security of the data. This, as such, can be a deterministic map from Q to N. In some cases, Q might require prohibitively large N, in which case the compiler component 510 can introduce bootstrapping in-between.

The padding selection component 536 does not utilize the tracked data flow in the HISA instructions. Instead, padding selection component 536 can analyze the metadata in the CipherTensor that flows through the FHE-adapted tensor circuit. If tensor operations like convolution require padding, then padding selection component 536 can determine that the previous operations, until the input, should maintain that padding. In some aspects, some tensor operations may change strides, in which case padding selection component 536 can determine that the padding required should scale by that factor. The input padding (e.g., in each ciphertext dimension) selected by padding selection component 536 can be the maximum padding required for any homomorphic tensor operation in the circuit.

The rotation key selection component 538 can track distinct slots utilized to rotate a FHE-adapted tensor circuit. By default, and by way of a non-limiting example, the HEAAN family of encryption schemes typically inserts public evaluation keys for power-of-two left and right rotations, and all rotations are performed using a combination of power-of-two rotations. The ciphertext size is N=2, so CKKS stores 2 log(N)−2 rotation keys by default. As the rotation keys generally consume significant memory, there is a trade-off between space and performance. By rotation key selection component 538 storing only these keys, any rotation can be performed. However, in a given FHE-adapted tensor circuit, the distinct slots to rotate would not be in the order of N. As such, rotation key selection component 538 can track and determine the distinct slots to rotate used in the FHE-adapted tensor circuit. All rotate HISA instructions store the constant slots to rotate in the symbolic analyzer component 530 (e.g., right rotations are converted to left rotations) and other HISA instructions can be ignored. The symbolic analyzer component 530 can then return the distinct slots to rotate that were utilized. In this way, compiler component 510 can generate the encryptor such that it can generate evaluation keys for these rotations utilizing the private key on the client, as described above with reference to FIGS. 2-3. The rotation key selection component 538 does not need to utilize power-of-two rotation keys, and the rotation keys chosen by the compiler component 510 are a constant factor of log(N).

The cost determining component 540 can determine a cost of a particular FHE-adapted tensor circuit under a particular specification based on a variety of factors, such as a duration to complete execution of the FHE-adapted tensor circuit configured with the particular specification, a number of operations performed by the FHE-adapted tensor circuit configured with the particular specification, and/or a number of library calls by the FHE-adapted tensor circuit configured with the particular specification, among other things. By way of non-limiting example, by utilizing a full-RNS variant of the CKKS encryption scheme and storing the ciphertexts and plaintexts in the number-theoretic-transform (NTT) domain, the complexity of mulPlain* can be decreased from O(n log(n)) to O(n). The compiler component 510 can encode the cost of each operation either from asymptotic complexity or from micro benchmarking (e.g., monitoring and logging) each operation. In various embodiments, increased asymptotic complexity or an increased number of operations can result in a higher cost associated with an operation and its corresponding tensor circuit specification. These costs can then be analyzed by the cost determining component 540 to decide which specification or data layout to choose for a given FHE-adapted tensor circuit. The cost determining component 540 can count the number of occurrences of each operation and then determine the asymptotic complexity and calculate a total cost of the circuit. In this regard, the transformer component 520 can generate or instantiate a new FHE-adapted tensor circuit corresponding to a particular tensor circuit specification or data layout, and a cost of the new FHE-adapted tensor circuit can be determined via cost determining component 540. This process can repeat for different data layout options, among other things.

The result generating component 542 can generate any combination of results associated with the execution of a FHE-adapted tensor circuit configured with a particular specification or data layout. In various embodiments, the result generating component 542 can generate a result including, but not limited to, a cost of a particular specification or data layout determined via cost determining component 540. The results generated for a FHE-adapted tensor circuit configured with a particular specification or data layout can be stored by the homomorphic evaluation server 110 into a storage device, such as data storage device 120 of FIG. 1, or can be communicated to a client device, such as client device 140 of FIG. 1, causing the client device 140 to provide for display the generated result.

The data layout selection component 550 can obtain the determined costs for each tensor circuit specification or data layout of the FHE-adapted tensor circuit to either select one with the lowest determined cost, or narrow a plurality of tensor circuit specifications or data layouts to a smaller subset based on corresponding determined costs. In more detail, a number of tensor circuit specifications or data layouts can be narrowed by comparing the costs to a defined threshold cost, and selecting only those tensor circuit specifications or data layouts determined to be below the defined threshold cost. In some other embodiments, a number of possible tensor circuit specifications or data layouts can be narrowed by ranking each tensor circuit specification or data layout based on determined costs (e.g., lowest cost to highest cost) and selecting only a predefined number of tensor circuit specifications or data layouts on a preferably lower cost end of a ranked list.

In various aspects, different homomorphic operations can have different costs, even within the same FHE scheme. The cost of homomorphic operations can also vary a lot based on small variations of the FHE scheme. For example, by utilizing a full-RNS variant of the CKKS scheme and storing the ciphertexts and plaintexts in the number-theoretic-transform (NTT) domain, data layout selection component 550 can decrease the complexity of mulPlain* from O(n log(n)) to O(n). The compiler component 510, employing data layout selection component 550, can encode the cost of each operation either from asymptotic complexity or from micro-benchmarking each operation. These costs can then be utilized by data layout selection component 550 to decide which implementation or data layout to choose for a given FHE-adapted tensor circuit. The symbolic analyzer component 530 in this case can count the number of occurrences of each operation and then utilize a determined asymptotic complexity to determine to the total cost of the circuit. The transformer component 520 can then create a FHE-adapted tensor circuit corresponding to a data layout and gets its cost via the symbolic analyzer component 530. This cycle repeats for different possible data layout options so that data layout selection component 550 can select one or more data layout options associated with the lowest determined cost, as described herein.

Figure 6:
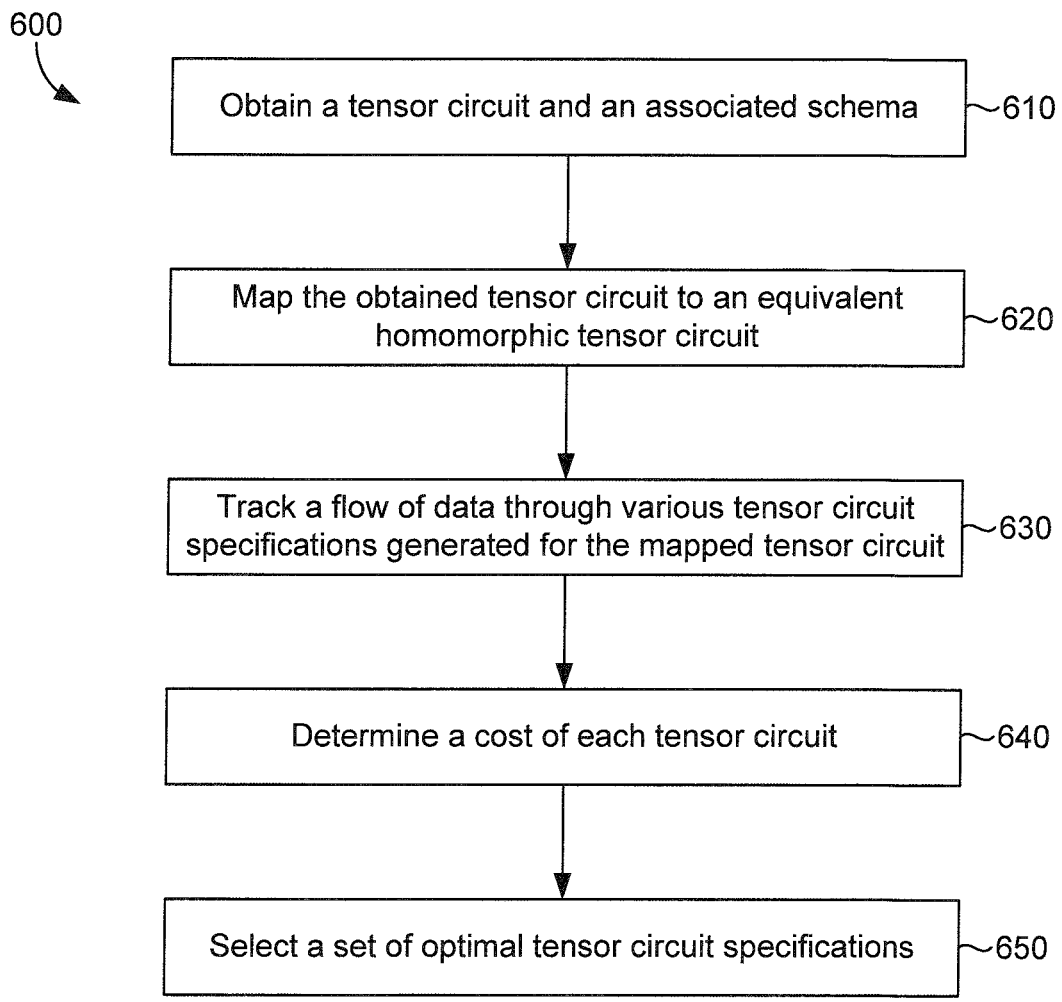
FIG. 6 is a flow diagram showing a method for generating optimized FHE-adapted tensor circuits in accordance with some embodiments of the present invention.

Turning now to FIG. 6, a flow diagram 600 is provided that illustrates a method for generating optimized FHE-adapted tensor circuits in accordance with some embodiments of the present disclosure. In various embodiments, a computing device such as homomorphic evaluation server 110 of FIG. 1 can obtain, at step 610, a tensor circuit and a schema associated with the tensor circuit. The tensor circuit and associated schema can be received from a client computing device, such as client device 140 of FIG. 1, or can be retrieved by the computing device from a local memory or a storage device, such as storage device 120 of FIG. 1. The tensor circuit and associated schema can be obtained as an input to for evaluating the tensor circuit and determining one or more optimal (e.g., efficient) specifications (e.g., data layouts) for the tensor circuit, among other things. In various embodiments, an efficiency measurement of a tensor circuit specification can be determined by the computing device during execution of the tensor circuit configured in accordance with the tensor circuit specification based on a variety of factors, such as a number of calls to a FHE library, such as FHE library store 570 of FIG. 5, or a determined asymptotic complexity of operations executed, among other things.

At step 520, the computing device can map the obtained tensor circuit to an equivalent FHE-adapted tensor circuit that is instantiated or generated for the obtained tensor circuit based at least in part on the obtained associated scheme. In other words, the computing device can employ a compiler component, such as compiler component 510 of FIG. 5, to specify a set of parameters to utilize in the obtained tensor circuit. The compiler component can employ the obtained input to define a cipher tensor datatype as a vector of ciphertexts (e.g., vectors) with associated metadata that can capture a way to interpret the vector of ciphertexts as a corresponding unencrypted tensor. The metadata can include, among other things, physical dimensions of the (outer) vector and those of the (inner) ciphertext, logical dimensions of the equivalent unencrypted tensor, and physical strides for each dimension of the (inner) ciphertext. As the obtained tensor circuit's dimensions are known based on the obtained schema, the compiler component can generate a FHE-adapted tensor circuit that is equivalent to the obtained tensor circuit, and further determine a policy to execute homomorphic computations therewith. In this regard, the compiler component can map the obtained tensor circuit to the generated equivalent FHE-adapted tensor circuit.

At step 630, the computing device can employ a symbolic analyzer component, such as symbolic analyzer component 530 of FIG. 5, to analyze the generated equivalent FHE-adapted tensor circuit and other tensor specifications generated for the generated equivalent FHE-adapted tensor circuit. The symbolic analyzer component can employ a runtime component, such as runtime component 560 of FIG. 5, to symbolically execute the generated equivalent FHE-adapted tensor circuit and other tensor specifications generated for the generated equivalent FHE-adapted tensor circuit.

In various embodiments, other tensor circuit specifications can be generated for the generated equivalent FHE-adapted tensor circuit by a transformer component, such as transformer component 520 of FIG. 5, of the compiler component. In various embodiments, the obtained tensor circuit can be mapped to a generated equivalent FHE-adapted tensor circuit with parameters left unspecified. As such, the computing device can employ the transformer component to determine parameters to utilize with the generated equivalent FHE-adapted tensor circuit.

In various embodiments, the compiler component can employ a parameter selection component, such as parameter selection component 536 of FIG. 5, to analyze a depth of the generated equivalent FHE-adapted tensor circuit and select a set of encryption parameters based on the analyzed depth. By way of a non-limiting example, In HEAAN encryption schemes, divScalar consumes modulus Q from the ciphertext it is called on. The output should have sufficient modulus Q left to capture accurate results. The symbolic analyzer component can employ a dummy ciphertext datatype that increments the modulus Q of the input ciphertext and copy into the output ciphertext whenever divScalar is called. In some other embodiments, other HISA instructions only copy the modulus from input to output. The modulus Q in the dummy output ciphertext corresponds to the depth of the circuit. The input ciphertext can thus be encrypted with modulus Q that is at least the sum of the depth of the circuit and the desired output precision.

In some further embodiments, the compiler component can also employ a padding selection component, such as padding selection component 536 of FIG. 5, to analyze the metadata in the CipherTensor that flows through the FHE-adapted tensor circuit. If tensor operations like convolution require padding, then the padding selection component can determine that the previous operations, until receipt of the input, should maintain the padding. In some embodiments, tensor operations can change strides, in which case the padding selection component can determine that the required padding scales by a factor corresponding to the change. The input padding (in each ciphertext dimension) selected by the padding selection component can correspond to the maximum padding required for any homomorphic tensor operation performed by the circuit.

In some further embodiments, the compiler component can also employ a rotation key selection component, such as rotation key selection component 538 of FIG. 5, which can track distinct slots utilized to rotate a generated equivalent FHE-adapted tensor circuit. By way of example, the HEAAN family of encryption schemes typically inserts public evaluation keys for power-of-two left and right rotations, and all rotations are performed using a combination of power-of-two rotations. The ciphertext size is $N=2$, so CKKS stores $2 \log(N)-2$ rotation keys by default. As the rotation keys generally consume significant memory, there is a trade-off between space and performance. With the rotation key selection component storing only these keys, any rotation can be performed. However, in a given FHE-adapted tensor circuit, the distinct slots to rotate would not be in the order of N. As such, the rotation key selection component can track the distinct slots to rotate used in the generated equivalent FHE-adapted tensor circuit. All rotate HISA instructions can store the constant slots to rotate in the symbolic analyzer component (e.g., right rotations are converted to left rotations) and other HISA instructions can be ignored. The symbolic analyzer component can then return the distinct slots to rotate that were used. In this way, the compiler component can generate the encryptor such that it can be employed to generate evaluation keys for these rotations utilizing the private key on the computing device or a client device, as described above with reference to FIGS. 2-3. In this regard, the rotation key selection component does not need to utilize power-of-two rotation keys, and the rotation keys chosen by the compiler component can remain a constant factor of $\log(N)$.

As the symbolic analyzer component employs the runtime component to symbolically execute each variation (e.g., specification, data layout) of the generated equivalent FHE-adapted tensor circuit, the computing device can employ a cost determining component, such as cost determining component 540 of FIG. 5, to determine a cost of each specification or data layout for the generated equivalent FHE-adapted tensor circuit. In various embodiments, the cost of a FHE-adapted tensor circuit specification can be determined based on a variety of factors, such as a determined duration to complete execution of the FHE-adapted tensor circuit under the specification or data layout, a determined number of operations performed by the FHE-adapted tensor circuit under the specification or data layout, and/or a determined number of library calls made by the FHE-adapted tensor circuit under the specification or data layout, among other things. In various embodiments, a determined increased asymptotic complexity or an increased number of operations can result in a higher cost associated with an operation and its corresponding tensor circuit specification. These costs can then be analyzed by the cost determining component to determine which specification or data layout to choose for a given FHE-adapted tensor circuit. In some embodiments, the cost determining component can count the number of occurrences of each operation and determine the asymptotic complexity to calculate to a total cost of the circuit. In this regard, the transformer component can generate or instantiate a new FHE-adapted tensor circuit corresponding to a particular tensor circuit specification or data layout and a cost of the FHE-adapted tensor circuit can be determined via the cost determining component. This process can repeat for different possible specifications or data layout options.

At step 650, the computing device can employ a data layout selection component, such as data layout selection component 550 of FIG. 5, which can obtain the costs for each tensor circuit specification or data layout of the FHE-adapted tensor circuit determined by the cost determining component. The data layout selection component can either select a specification or data layout with a lowest determined cost, or narrow a plurality of tensor circuit specifications or data layouts to a smaller subset. In some embodiments, a number of tensor circuit specifications or data layouts can be narrowed by comparing the costs to a defined threshold cost, such that a smaller subset of tensor circuit specifications or data layouts determined to be below the defined threshold cost are selected by the data layout selection component. In some other embodiments, the number of tensor circuit specifications or data layouts can be narrowed by ranking each tensor circuit specification or data layout based on its determined cost (e.g., lowest cost to highest cost) such that only a predefined number of tensor circuit specifications or data layouts on a lowest cost end of a ranked list of tensor circuit specifications or data layouts is selected by the data layout selection component.

In some further embodiments, the computing device can store the selected set of tensor circuit specifications or data layouts into a storage media or device, provide the selected set of tensor circuit specifications or data layouts for display, and/or communicate the selected set of tensor circuit specifications or data layouts to a client device, such as client device 140 of FIG. 1. In this way, the communicated set can cause the client device to provide for display the selected set of tensor circuit specifications or data layouts determined most cost-efficient (e.g., optimal) for configuring the FHE-adapted tensor circuit associated with the obtained tensor circuit and schema. The provided set of tensor circuit specifications or data layouts can be employed by any computing device, such as the client device, to optimize the specification or data layout of a FHE-adapted tensor circuit utilized for performing homomorphic encryption operations on encrypted data.

Figure 7:
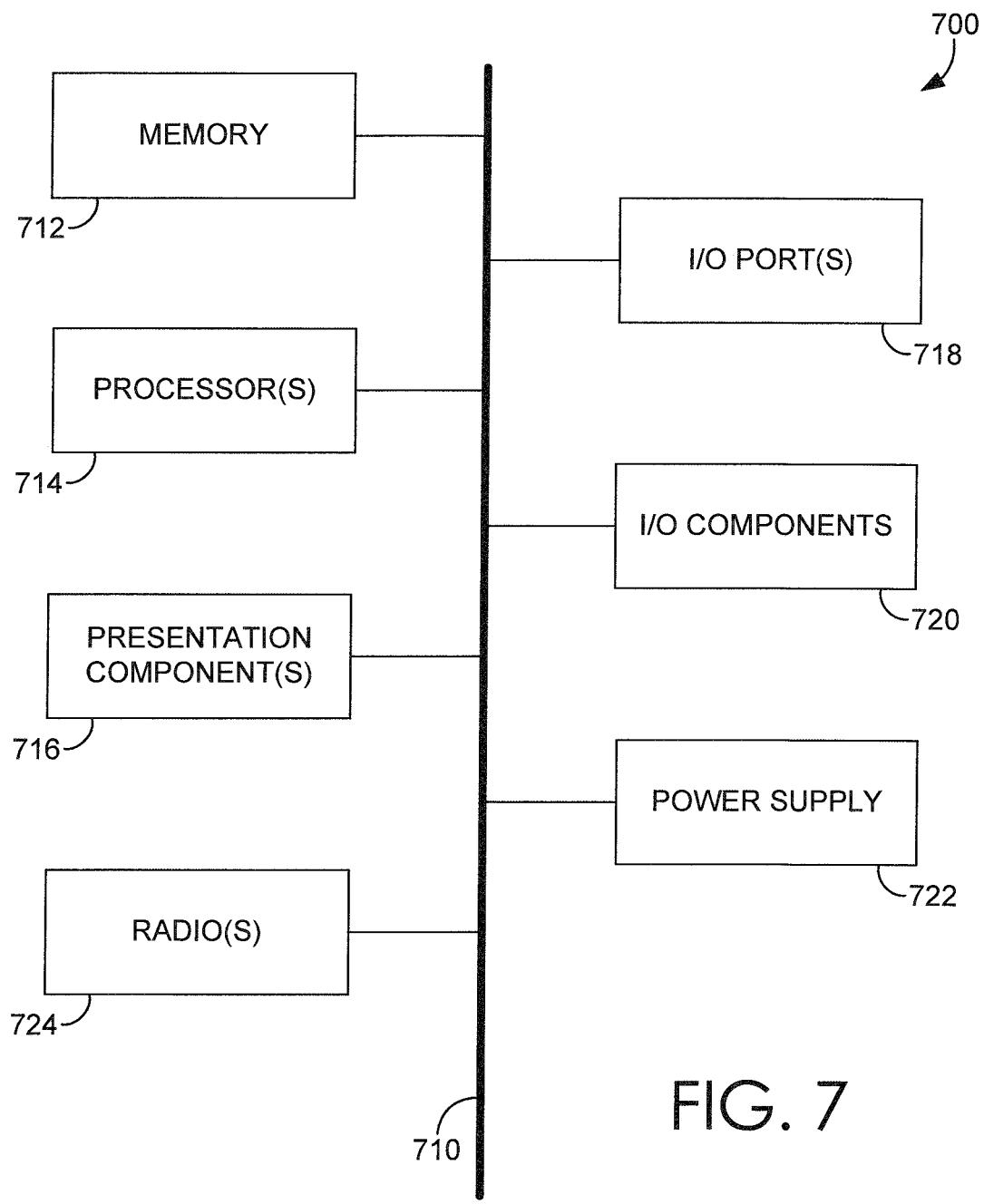
FIG. 7 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, optimizing the generation, evaluation, and selection of FHE-adapted tensor circuits and corresponding specifications (e.g., encryption parameters, data layouts) to perform homomorphic encryption operations on encrypted data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for generating optimized fully-homomorphic encryption (FHE)-adapted tensor circuits, the method comprising:
    obtaining, by a computing device, a tensor circuit a schema associated with the tensor circuit, and a defined output precision;
    mapping, by the computing device, the obtained tensor circuit to an equivalent FHE-adapted tensor circuit that is generated based at least in part on the associated schema and the defined output precision;
    monitoring, by the computing device, calls to a library passing through the generated equivalent FHE-adapted tensor circuit for each corresponding one of a plurality of determined specifications being utilized by the generated equivalent FHE-adapted tensor circuit;
    determining, by the computing device, a cost of each specification in the plurality of determined specifications based at least in part on the corresponding monitored library calls; and
    selecting, by the computing device, a set of specifications from the determined plurality of specifications based at least in part on the determined costs, wherein the selected set corresponds to a set of specifications for the obtained tensor circuit to perform homomorphic encryption operations on encrypted data.

2. The computer-implemented method of claim 1, wherein each specification is determined based at least in part on the monitored library calls corresponding to a previously-determined specification utilized by the generated equivalent FHE-adapted tensor circuit.

3. The computer-implemented method of claim 1, wherein a set of encryption parameters is selected for each specification of the determined plurality of specifications based at least in part on a determined depth of the obtained tensor circuit.

4. The computer-implemented method of claim 1, wherein the generated equivalent FHE-adapted tensor circuit utilizing each of the determined plurality of specifications is symbolically executed via a runtime.

5. The computer-implemented method of claim 1, wherein a data object is generated based at least in part on the obtained tensor circuit and associated schema, the data object being employable to determine a padding for a particular homomorphic tensor operation being symbolically executed via the generated equivalent FHE-adapted tensor circuit.

6. The computer-implemented method of claim 1, wherein the cost of each determined specification is determined based further in part on a corresponding asymptotic complexity.

7. The method of claim 1, wherein a number of calls to the library is monitored, and the cost of each specification is determined based at least in part on the corresponding monitored number of library calls.

8. The computer-implemented method of claim 1, wherein the defined output precision corresponds to a floating point precision.

9. The computer-implemented method of claim 1, wherein the schema includes inputs and weights.

10. A non-transitory computer storage medium storing computer-useable instructions that, when used by one or more computing devices, cause the one or more computing devices to perform operations comprising:
    obtaining a tensor circuit a schema associated with the tensor circuit, and a defined output precision;
    mapping the obtained tensor circuit to an equivalent fully-homomorphic encryption (FHE)-adapted tensor circuit that is generated based at least in part on the associated schema and the defined output precision;
    monitoring calls to a library passing through the generated equivalent FHE-adapted tensor circuit for each corresponding one of a plurality of determined specifications being utilized by the generated equivalent FHE-adapted tensor circuit;
    determining a cost of each specification in the plurality of determined specifications based at least in part on the corresponding monitored library calls; and
    selecting a set of specifications from the determined plurality of specifications based at least in part on the determined costs, wherein the selected set corresponds to a set of specifications for the obtained tensor circuit to perform homomorphic encryption operations on encrypted data.

11. The non-transitory computer storage medium of claim 10, wherein each specification is determined based at least in part on the monitored library calls corresponding to a previously-determined specification utilized by the generated equivalent FHE-adapted tensor circuit.

12. The non-transitory computer storage medium of claim 10, wherein a set of encryption parameters is selected for each specification of the determined plurality of specifications based at least in part on a determined depth of the obtained tensor circuit.

13. The non-transitory computer storage medium of claim 10, wherein the generated equivalent FHE-adapted tensor circuit utilizing each of the determined plurality of specifications is symbolically executed via a runtime.

14. The non-transitory computer storage medium of claim 10, wherein a data object is generated based at least in part on the obtained tensor circuit and associated scheme, the data object being employable to determine a padding for a particular homomorphic tensor operation being symbolically executed with the generated equivalent FHE-adapted tensor circuit.

15. The non-transitory computer storage medium of claim 10, wherein the cost of each determined specification is determined based further in part on a corresponding asymptotic complexity.

16. A system, comprising:
   at least one hardware processor;
   an input receiving means for receiving a tensor circuit, a schema associated with the tensor circuit, and a defined output precision;
   a transforming means for mapping the received tensor circuit to a fully-homomorphic encryption (FHE)-adapted tensor circuit that is generated based at least in part on the associated schema and the defined output precision, the equivalent FHE-adapted tensor circuit having a first specification based at least in part on the associated schema and the defined output precision;
   a symbolic analyzing means for providing results generated for a symbolic execution of the FHE-adapted, wherein the results are generated to instantiate the FHE-adapted tensor circuit having a second specification that is equivalent to the received tensor circuit;
   a cost determining means for determining a cost of the symbolically executed FHE-adapted tensor circuit based at least in part on monitored calls to a library passing through the FHE-adapted tensor circuit; and
   a data layout selecting means for selecting one or more efficient specifications for the FHE-adapted tensor circuit based at least in part on the determined costs of the symbolically executed FHE-adapted tensor circuit utilizing at least the first and second specifications, wherein the selected one or more efficient specifications corresponds to a set of specifications for the received tensor circuit to perform homomorphic encryption operations on encrypted data.

17. The system of claim 16, further comprising:
   a parameter selecting means for selecting encryption parameters to symbolically execute the FHE-adapted tensor circuit, the encryption parameters being selected for the FHE-adapted tensor circuit based at least in part on a determined depth of the received tensor circuit.

18. The system of claim 16, further comprising:
   a compiling means for generating a data object corresponding to the received tensor circuit based at least in part on the associated schema, the data object being employable to determine a padding for a particular homomorphic tensor operation performed in the symbolic execution of the equivalent FHE-adapted tensor circuit.

19. The system of claim 16, further comprising:
   a FHE-adapted tensor circuit transforming means for instantiating the FHE-adapted tensor circuit having the second specification based on the generated results.

* * * * *